United States Patent Office 3,085,092
Patented Apr. 9, 1963

3,085,092
PREPARATION OF LYSERGIC ACID DERIVATIVES, AND INTERMEDIATES
Albert Hofmann and Franz Troxler, Bottmingen, Basel-Land, Switzerland, assignors to Sandoz Ltd. (also known as Sandoz A.G.), Basel, Switzerland, a Swiss firm
No Drawing. Filed Oct. 4, 1961, Ser. No. 142,791
Claims priority, application Switzerland Oct. 6, 1960
6 Claims. (Cl. 260—285.5)

The present invention relates to a process for the production of lysergic and dihydrolysergic acid derivatives.

The present invention provides a process for the production of compounds of general Formula I,

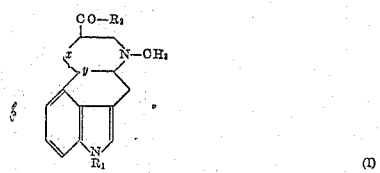

(I)

wherein $R_1$ signifies a member selected from the group consisting of hydrogen, an alkyl containing from 1 to 4 carbon atoms inclusive, an alkenyl containing from 2 to 4 carbon atoms inclusive, $R_2$ signifies a member selected from the group consisting of hydroxy, an alkylamino containing from 1 to 4 carbon atoms inclusive and a hydroxyalkylamino containing from 1 to 4 carbon atoms inclusive, and

signifies a member selected from the group consisting of $$-CH=C\diagup$$

and $$-CH_2-CH\diagup$$

groupings, their physiologically acceptable salts with acids, characterised in that a pyrazole derivative of general Formula IV,

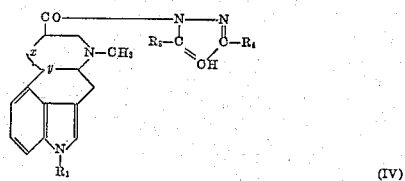

(IV)

in which $R_1$ has the above significance, and $R_3$ and $R_4$ each signifies a member selected from the group consisting of alkyl containing from 1 to 4 carbon atoms inclusive, is reacted in solution with a compound of general Formula V, $$H-R_2 \qquad (V)$$

in which $R_2$ has the above significance, the reaction being effected in the presence of alkali or acid when $R_2$ in compound V signifies —OH, and, when a salt is desired, salification is effected with an organic or inorganic acid.

Compound IV may be produced by reacting a lysergic or dihydrolysergic acid hydrazide of general Formula II,

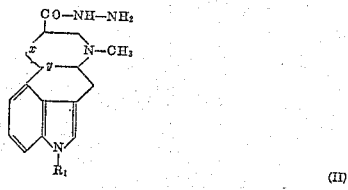

(II)

in which $R_1$ and

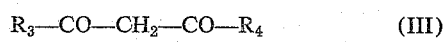

have the above significance, with a diketone of general Formula III, $$R_3—CO—CH_2—CO—R_4 \qquad (III)$$

in which $R_3$ and $R_4$ have the above significance, in the presence of slightly more than the equivalent quantity of inorganic acid.

Compounds I, in which $R_2$ signifies a hydroxy radical and $R_1$ and

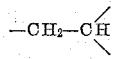

have the above significance, may further be produced by reacting compound II with compound III in the presence of at least 2 equivalents of an inorganic acid; in this case also the intermediate compound is produced but is not isolated.

The process in accordance with the invention may, for example, be effected as follows: 1 mol of a compound II, e.g. D-lysergic acid hydrazide, 2 mols of compound III, e.g. acetyl-acetone, 1.1 to 1.5 mol of inorganic acid, e.g. hydrochloric acid, water and an inert solvent, e.g. dimethoxy-ethane, are left to stand at ambient temperature until the reaction is complete (e.g. after 15 to 30 minutes). On neutralising, compound IV precipitates at ambient temperature. Instead of using dimethoxy-ethane as solvent, water-miscible ethers, tetrahydrofuran, dioxane or lower aliphatic alcohols may be used as solvent.

The compounds I, in which $R_2$ signifies an alkylamino or hydroxyalkylamino radical containing from 1 to 4 carbon atoms inclusive, and $R_1$ and

have the above significance, are produced by allowing an alkylamine or an amino alcohol to stand with compound IV for a number of hours at room temperature or higher. After removal of the excess amine or amino alcohol and the pyrazole, which is split off by the reaction, the residue is purified by crystallisation and/or chromatography to yield the desired compound I. The reaction may be accelerated by increasing the temperature. If the boiling point of the amine used allows, the temperature at which the reaction takes place is preferably of the order of 100° C.

Should a relatively large excess of an amino compound V (5 to 20 parts by weight per part by weight of compound IV) be used, the addition of an inert solvent is not necessary, since the excess then acts as solvent. Should, however, only a small excess be employed, then the conversion must be effected in the presence of an inert solvent, e.g. chloroform. It has been found that the production of amides of the lysergic acid series is accompanied by a transposition to a larger or lesser extent, D-lysergic acid (+)-butanolamide-(2') as well as D-isolysergic acid (+)-butanolamide-(2') being obtained from 1-(D-lysergyl)-3,5-dimethyl-pyrazole and (+)-butanolamine-(2'). The separation may however, easily be effected by the usual methods, e.g. by chromatography.

Compounds I, in which $R_2$ singifies the hydroxy radical and $R_1$ and have the above significance, may, for example, also be produced as follows, whereby it should be noted that the intermediate product IV is not isolated: 2 mols of acetylacetone are added to a solution of 1 mol of compound II, e.g. D-isolysergic acid hydrazide, in 2 equivalents of N hydrochloric acid and ethanol, the mixture left to stand until the reaction is complete at ambient temperature (no heating is necessary) and then neutralised with an alkali metal hydroxide solution, the compound I separating in the crystalline form and being washed with chloroform after drying. Ethers which are miscible with water, e.g. dimethoxyethane, tetrahydrofuran, dioxane, as well as lower aliphatic alcohols, are suitable inert solvents. At least two, but preferably approximately 5, equivalents of a mineral acid, which forms a salt with the starting material, which is soluble in the solvent used, preferably hydrochloric acid, are employed per mol of the compound II used. Under the above conditions the reaction is completed after 1 to 3 hours. The solution is worked up by neutralising the reaction mixture with sodium or potassium hydroxide, the desired final product separating in crystalline form.

Compounds I may be used as pharmaceuticals or as intermediate products in the production of pharmaceuticals. At least some of the compounds I in which $R_2$ signifies an alkylamino radical or a hydroxyalkylamino radical have useful pharmaceutical properties, whilst those in which $R_2$ signifies the hydroxy radical are generally valuable starting materials in the production of pharmaceuticals; hitherto, however, the free acids have been obtainable only with the greatest of difficulty and natural ergot alkaloids were used as starting materials. The present synthesis is relatively simpler than the hitherto known methods. It has the advantage that the starting materials used are stable at room temperature and may thus be handled quite easily.

The present invention enables compounds I to be isolated in a highly pure form after removal of the excess amine and the split off pyrazole; this advantage is of particular importance industrially and allows commercial production of compounds I.

The present invention also provides pharmaceutical compositions containing, in addition to an inert carrier, a product produced by the process of the invention.

In the following non-limitative examples all temperatures are stated in degrees centigrade and are uncorrected.

*Example 1.—9,10-Dihydro-L-Lysergic Acid Ethylamide*

A solution of 1.41 g. of 9,10-dihydro-D-lysergic acid hydrazide in 5.5 cc. of N hydrochloric acid, 5 cc. of water and 5 cc. of ethanol, are left to stand with 1 g. of acetylacetone for 1 hour at room temperature, the mixture then neutralised by addition of 5.5 cc. of N sodium hydroxide, the 1-(9',10'-dihydro-D-lysergyl)-3,5 - dimethyl-pyrazole filtered off and washed with water. The crude product, dried in a vacuum at 60°, is then crystallised from chloroform by the addition of ether. Triangular leaflets having a melting point of 215–216°. $[\alpha]_D^{20}=-89°$ (c.=0.5 in pyridine). Keller's colour reaction: blue. 100 mg. of 1-(9',10'-dihydro-D-lysergyl)-3,5 - dimethyl-pyrazole and 2 cc. of ethylamine are left to stand for 15 hours at room temperature, evaporated to dryness, the residue heated for a few minutes in a vacuum to 100° and the remaining 9,10-dihydro-D-lysergic acid ethylamide crystallised from chloroform/petroleum ether. Leaflets having a melting point of 257–263°. $[\alpha]_D^{20}=-136°$ (c.=0.5 in pyridine).

*Example 2.—9,10-Dihydro-D-Lysergic Acid (+)-Butanolamide-(2')*

400 mg. of 1-(9',10'-dihydro-D-lysergyl)-3,5-dimethyl-pyrazole and 2.5 cc. of (+)-butanolamine-(2') are heated for 2 hours to 100° and the remaining 9,10-dihydro-D-lysergic acid (+)-butanolamide-(2') crystallised from a mixture of chloroform/methanol by adding petroleum ether. Needles having a melting point 247–248°. $[\alpha]_D^{20}=-149°$ (c.=0.5 in pyridine).

*Example 3.—D-Lysergic Acid (+)-Butanolamide-(2') And D-Isolysergic Acid (+)-Butanolamide-(2')*

A solution of 1.41 g. of D-lysergic acid hydrazide in 5.5 cc. of N hydrochloric acid, 5 cc. of water and 3.5 cc. of dimethoxy-ethane, and 0.75 g. of acetylacetone are left to stand for 15 minutes at room temperature, then neutralised by the addition of 5.5 cc. of N sodium hydroxide, the 1-(D-lysergyl)-3,5-dimethyl-pyrazole filtered off and washed with water. The crude product dried in a vacuum at 60° is then crystallised from chloroform by the addition ether. Prisms having a melting point 175–177°. $[\alpha]_D^{20}=+70°$ (c.=0.5 in pyridine). Keller's colour reaction: blue.

200 mg. of 1-(D-lysergyl)-3,5-dimethyl-pyrazole are mixed with 3 cc. of (+)-butanolamine-(2') and the mixture left to stand for 6 hours at room temperature, during which time complete dissolution takes place slowly. The excess butanolamine and the split off 3,5-dimethyl-pyrazole is removed by heating in a high vacuum at 110° and the remaining mixture of D-lysergic acid (+)-butanolamide-(2') and D-isolysergic acid (+)-butanolamide-(2') chromatographed on a column of 8 g. of aluminium oxide. D-lysergic acid (+)-butanolamide-(2') is eluted with chloroform containing 0.2% of ethanol. Needles having a melting point 160–170° are obtained from chloroform. $[\alpha]_D^{20}=-45°$ (c.=0.5 in pyridine). D-isolysergic acid (+)-butanolamide-(2') is then eluted with chloroform containing 1% of ethanol. Needles having a melting point 188° result from chloroform. $[\alpha]_D^{20}=+385°$ (c.=0.5 in pyridine).

*Example 4.—D-Isolysergic Acid*

A solution of 1.41 g. of D-isolysergic acid hydrazide in 10 cc. of N hydrochloric acid containing 5 cc. of ethanol and 1 g. of acetylacetone are left to stand at room temperature for one and a half hours, the reaction mixture is then neutralised with 10 cc. of N sodium hydroxide, filtered and the residue washed with water, whereupon it is suspended in 10 cc. of chloroform after drying in a vacuum at 60°, the pure D-isolysergic acid remaining practically undissolved. Melting point 213–218°. $[\alpha]_D^{20}=+271°$ (c.=0.5 in pyridine).

*Example 5.—9,10-Dihydro-D-Lysergic Acid*

A solution of 1.42 g. of 9,10-dihydro-D-lysergic acid hydrazide in 20 cc. of N hydrochloric acid and 10 cc. of ethanol, and 1 g. of acetylacetone are left to stand at room temperature for 2 hours, the reaction mixture neutralised by the addition of 20 cc. of N sodium hydroxide, filtered and the precipitate washed with water, whereupon it is suspended in 10 cc. of a N sodium hydroxide solution. The undissolved compound is filtered off and the pure 9,10-dihydro-D-lysergic acid is precipitated by adding 10 cc. of N hydrochloric acid dropwise. Melting point 315°. $[\alpha]_D^{20}=-121°$ (c.=0.5 in pyridine).

*Example 6.—1-Ethyl-9,10-Dihydro-D-Lysergic Acid*

A solution of 312 mg. of 1-ethyl-9,10-dihydro-D-lysergic acid hydrazide in 5 cc. of N hydrochloric acid and 2 cc. of dimethoxyethane together with 160 mg. of acetylacetone are left to stand at room temperature for 2 hours; at the end of this period spontaneous crystallisation of the hydrochloride of 1-ethyl-9,10-dihydro-D-lysergic acid in the shape of colourless prisms occurs. To complete the the crystallisation the solution is left for a further hour at 0°, filtered and washed with a little cold water. Melting point 318–319°. $[\alpha]_D^{20}=68°$ (c.=0.5 in pyridine). Keller's colour reaction: blue.

*Example 7.—1-Allyl-9,10-Dihydro-D-Lysergic Acid*

380 mg. of 1-allyl-dihydro-D-lysergic acid hydrazide in 6 cc. of N hydrochloric acid and 3 cc. of dimethoxy-ethane, and 1.9 g. of acetylacetone are left to stand for 2 hours at room temperature, spontaneous crystallisation of the hydrochloride of 1-allyl-9,10-dihydro-D-lysergic acid occurring in colourless prisms. To complete the crystallisation the solution is left to stand for a short time at 0°, filtered and then washed with a little cold water. Melting point 280–285°. $[\alpha]_D^{20}=-62°$ (c.=0.3 in water). Keller's colour reaction: blue.

*Example 8.—1-Methyl-9,10-Dihydrolysergic Acid*

7 cc. of dimethoxyethane, 1.35 g. of acetylacetone and 5 g. of ice are added to a solution of 2.96 g. of 1-methyl-9,10-dihydro-D-lysergic acid hydrazide in 12 cc. of 1 N hydrochloric acid, the mixture is shaken vigorously and left to stand for 3 hours at room temperature. The mixture is then neutralised by adding 12 cc. of a 1 N sodium hydroxide solution dropwise, shaken with chloroform, the dried chloroform solution evaporated until syrupy and ether slowly added, the 1-(1'-methyl-9',10'-dihydro-D-lysergyl)-3,5-dimethyl-pyrazole separating in microcrystalline form. Melting point 148–150°. $[\alpha]_D^{20} = -90°$ (c.=0.5 in pyridine). A solution of 1 g. of this pyrazole and 30 cc. of dimethoxy-ethane is left to stand in 10 cc. of a 1 N sodium hydroxide soltuion for 3 hours at room temperature, the solution neutralised by adding 10 cc. of 1 N hydrochloric acid dropwise and the separated 1-methyl-9,10-dihydro-D-lysergic acid filtered off and washed with water. Melting point 335° (decomposition). $[\alpha]_D^{20} = -111° \pm 20°$ (c.=0.05 in pyridine).

Having thus disclosed the invention what is claimed is:

1. (9',10'-dihydro-D-lysergyl)-3,5-dimethyl-pyrazole.
2. 1-(D-lysergyl)-3,5-dimethyl-pyrazole.
3. 1 - (1' - methyl - 9',10' - dihydro - D - lysergyl) - 3,5-dimethyl-pyrazole.
4. A process for the production of compounds of the formula

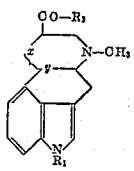

wherein $R_1$ is a member selected from the group consisting of hydrogen, an alkyl group having 1 to 4 carbon atoms and an alkenyl group having 2 to 4 carbon atoms, $R_2$ is a radical selected from the group consisting of hydroxyl, an alkylamino group having 1 to 4 carbon atoms and a hydroxyalkylamino group having from 1 to 4 carbon atoms, and

is a member selected from the group consisting of

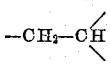

and the

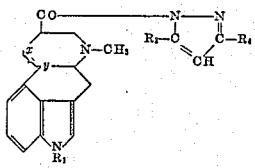

grouping, which comprises reacting a pyrazole derivative of the formula

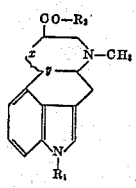

wherein $R_1$ has the above significance, and $R_3$ and $R_4$ are each alkyl groups having from 1 to 4 carbon atoms in a water solution and in the presence of a condensing agent selected from the group consisting of inorganic alkali and inorganic acid with a compound of the formula H—$R_2$ wherein $R_2$ has the above significance.

5. A process for the production of compounds of the formula

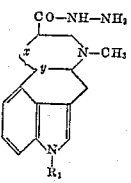

wherein $R_1$ is a member selected from the group consisting of hydrogen, an alkyl group having 1 to 4 carbon atoms and an alkenyl group having from 2 to 4 carbon atoms, $R_2$ is a radical selected from the group consisting of hydroxyl, an alkylamino group having 1 to 4 carbon atoms and a hydroxyalkylamino group with 1 to 4 carbon atoms; and

is a member selected from the group consisting of the

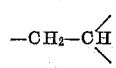

and the

grouping, which comprises reacting a compound of the formula

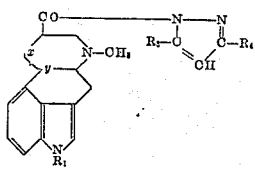

wherein $R_1$ and

have the above significance with a diketone of the formula $$R_3—CO—CH_2—CO—R_4$$

wherein $R_3$ and $R_4$ are alkyl groups having 1 to 4 carbon atoms in the presence of from 1 to 2 equivalents of an inorganic acid and reacting the so-obtained pyrazol derivative of the formula

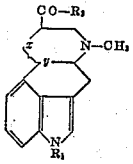

wherein $R_1$, $R_3$ and $R_4$ have the above significance, with a compound of the formula $$H—R_2$$

wherein $R_2$ has the above significance in a water solution in the presence of a condensing agent selected from the group consisting of inorganic alkali and inorganic acid.

6. A process for the production of compounds of the formula

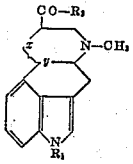

wherein $R_1$ is a member selected from the group consisting of hydrogen, an alkyl group having 1 to 4 carbon atoms and an alkenyl group having from 2 to 4 carbon atoms, $R_2$ is hydroxyl and

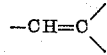

is a member selected from the group consisting of the

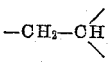

and the grouping, which comprises reacting a compound of the formula
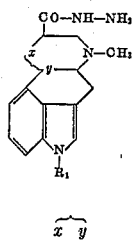
wherein $R_1$ and $\overbrace{x\ y}$ have the above significance, in the presence of from 2 to 10 equivalents of an inorganic acid with a compound of the formula
$$R_3\text{—CO—CH}_2\text{—CO—}R_4$$
wherein $R_3$ and $R_4$ are alkyl groups having 1 to 4 carbon atoms.
No references cited.